United States Patent [19]
Jain

[11] Patent Number: 6,044,211
[45] Date of Patent: Mar. 28, 2000

[54] METHOD FOR GRAPHICALLY REPRESENTING A DIGITAL DEVICE AS A BEHAVIORAL DESCRIPTION WITH DATA AND CONTROL FLOW ELEMENTS, AND FOR CONVERTING THE BEHAVIORAL DESCRIPTION TO A STRUCTURAL DESCRIPTION

[75] Inventor: Prem P. Jain, Travis, Tex.

[73] Assignee: C.A.E. Plus, Inc., Austin, Tex.

[21] Appl. No.: 08/212,908

[22] Filed: Mar. 14, 1994

[51] Int. Cl.⁷ .................................................. G06F 17/50
[52] U.S. Cl. ......................................................... 395/500.19
[58] Field of Search .................................... 364/488, 489, 364/490, 578; 395/500, 500.19

[56] References Cited

U.S. PATENT DOCUMENTS

| | | | |
|---|---|---|---|
| 4,656,603 | 4/1987 | Dunn | 364/488 |
| 4,813,013 | 3/1989 | Dunn | 364/488 |
| 5,034,899 | 7/1991 | Schult | 364/488 |
| 5,067,091 | 11/1991 | Nakazawa | 364/490 |
| 5,146,583 | 9/1992 | Matsumaka et al. | 395/500 |
| 5,155,836 | 10/1992 | Jordan et al. | 395/500 |
| 5,164,911 | 11/1992 | Juran et al. | 364/578 |
| 5,220,512 | 6/1993 | Watkins et al. | 364/489 |
| 5,222,030 | 6/1993 | Dangelo et al. | 364/489 |
| 5,258,919 | 11/1993 | Yamanouchi et al. | 364/489 |
| 5,274,793 | 12/1993 | Kuroda et al. | 395/500 |
| 5,276,855 | 1/1994 | Kitahara | 395/500 |
| 5,331,569 | 7/1994 | Iijima | 364/489 |
| 5,333,032 | 7/1994 | Matsumoto et al. | 364/489 |
| 5,345,393 | 9/1994 | Ueda | 364/489 |
| 5,371,683 | 12/1994 | Fukazawa et al. | 364/489 |

*Primary Examiner*—Kevin J. Teska
*Assistant Examiner*—Hugh Jones
*Attorney, Agent, or Firm*—Kevin L. Daffer; Conley, Rose & Tayon

[57] ABSTRACT

A computer-aided synthesis and verification tool is provided for modeling a digital device at a behavioral level and for synthesizing to a structural level utilizing user-defined attributes. The behavioral level is represented as a Data Dependency Graph (DDG) having a plurality of operations (shown as nodes) and operands (shown as arcs) which connect the nodes. Each operation or node is represented as a graphical icon, wherein the icon can have user-defined attributes associated with it. The attributes, nodes, and arcs are compiled and reduced to a Register Transfer Level (RTL) simulation model compatible with present VHDL and Verilog formats. Conversion from a behavioral model to an RTL model includes monitoring the internal states at rising clock edges and constructing states, events and event transistions (i.e., control path information) for each data value in the matrix of values within the data path. The resulting RTL model therefore includes both control path information and data path information, and can be further reduced to technology dependent or silicon dependent circuits or structures.

25 Claims, 9 Drawing Sheets

Microfiche Appendix Included
(2 Microfiche, 152 Pages)

METHOD FOR GRAPHICALLY REPRESENTING A DIGITAL DEVICE AS A BEHAVIORAL DESCRIPTION WITH DATA AND CONTROL FLOW ELEMENTS, AND FOR CONVERTING THE BEHAVIORAL DESCRIPTION TO A STRUCTURAL DESCRIPTION

BACKGROUND OF THE INVENTION

Incorporated herein is a computer program listing microfiche appendix of source code used to generate parameter values from the behavioral model netlist and to monitor those values on clock edges. Further incorporated herein is a microfiche appendix of a USERS MANUAL which describes graphical user interface (GUI), a data dependency graph (DDG), and an architectural model obtained from GUI and DDG. Copyright, 1993, C.A.E. Plus, Inc. A portion of the disclosure to this patent document contains material which is subject to copyright protection. The copyright owner has no objected to the facsimile reproduction by anyone of the "microfiche appendix", as it appears in the Patent and Trademark Office file or records, but otherwise reserves all copyright rights whatsoever.

1. Field of the Invention

This invention relates to computer-aided synthesis and verification of a digital device and, more particularly,to an object-oriented representation of the digital device, and the conversion of said device from a behavioral level to an register transfer level (RTL) of structural abstraction.

2. Description of the Relevant Art

Computer-aided design is a tool which allows the circuit or systems designer to produce a low level structural description of the circuit and system from a higher level of design abstraction. There are many types of design tools which aid the designer in bringing his design from an idea or concept to a structure which will be eventually embodied within a working circuit or system. Design tools therefore produce cost-effective development of commercial electronics and streamline the design/development process.

In 1981, the U.S. Government initiated an effort to standardize design tools such that the standardized tool would be technology independent and not be tied to a particular simulator or simulator vendor. Accordingly, the standardized tool would be capable of synthesizing and/or verifying various hardware technologies including MOS, bi-polar, ECL, etc., and also would be capable of operation on any and all simulators. The efforts by the U.S. Government culminated in a Very High Speed Integrated Circuit (VHSIC) Hardware Description Language ("VHDL") language. VHDL language is described and set forth as an IEEE standard 1076 (herein incorporated by reference).

To gain understanding of computer-aided design, and the terms related thereto, a basic understanding of VHDL is required. VHDL is a language for describing general digital hardware devices. VHDL language is therefore a standardized tool which includes various levels of design description including: behavioral, timing, and structural. Each description is represented as a model of a discrete hardware element.

In describing the behavioral description model, a basic premise is understood: a digital device is a collection of operations applied to values being passed through the device. In VHDL, each operation is referred to as a process, and the pathways in which values (e.g., one or zero binary value) are passed through the system are referred to as signals. A process is often viewed as a program, and a program is constructed out of procedural statements called subprograms much like a program written in general purpose procedural language like Pascal or C. FIG. 1 illustrates a process in which an operation exclusive ors two input signals to produce an output signal. The VHDL behavioral model is a collection of independent programs or processes running in parallel. In order to coordinate a set of processes running concurrently, a mechanism is defined to handle the communication between process, wherein this mechanism is the signal. In particular, signals define a data pathway between two processes. The data pathway (often referred to as data path) is directed; one side of the pathway generates a value and the other side receives the value. As such, all communication between processes take place over these pathways to form a data path within and between the modeled digital device.

Referring now to FIG. 2, data pathways 12 are shown connecting processes 10. General timing description model is understood by the concept of stimulus-response paradigm. Once a digital device receives a stimulus, the device responds and then waits for another stimulus. Accordingly, when process 10 generates a value on a data pathway it may also designate the amount of time before the value is sent over the pathway, and this is referred to as scheduling a transaction. It is possible to schedule any number of transactions or events (changes in value) for a given pathway 12.

Most designers design at a structural level. A structural description model 14 is shown for a specific digital device which, in the example provided, is a sequential device having two input ports 16 and a singular output port 18. Data flow within model 14 arrives in parallel at the first stage 20 and, based upon the output values produced, provides an output event from the second stage 22. Scheduling of events and placement of values at select data pathways in a timing model is often times difficult to achieve and simulate.

The VHDL designer models structure 14 by performing what is often called an entity declaration. Processes within the structural model can also be coded in a process statement. As an example, the VHDL entity declaration (structural description) of a half adder digital device is as follows:

entity Half_adder is
      port (
      X: in Bit;
      Y: in Bit;
      Sum: out Bit;
      Carry: out Bit);
    end Half_adder;

The VHDL process statement (behavioral description) of the exemplary half adder device is as follows:

architecture Behavioral_description of Half_adder is
      begin
      process
        Sum<=X xor Y after 5 Ns;
        Carry<=X and Y after 5 Ns;
        wait on X, Y;
      end process;
    end Behavioral_description;

VHDL coding comprises behavioral or structural description language, exemplary such language is set forth above. Additionally, VHDL language can include a mixture of behavioral and structural language. In all instances, however, there is no synergism between the behavioral and structural language. In other words, even if both behavioral and structural language are contained within a code listing for a specific device, the designer must manually change the behavioral description for a chosen structural description and vice versa. There is no linkage between operations unless the designer enters (i.e., codes) a linkage. Unfortunately, any change to one model requires manual change to the other. Manual translation between models necessary to ensure consistency and obtain a complete modeling outline is time-consuming. A VHDL user will oftentimes discontinue burdensome manual entry and focus upon only one model (behavioral or structural) rather than continuing translation.

An important aspect of VHDL is the standardized language used to represent or model a digital device at various levels of design description language. The final modeling outcome of VHDL is a structural level of design description termed register transfer level (RTL). RTL is well known in the art as being a description representative of structural aspects of the device. Accordingly, RTL includes a data path comprising numerous physical elements (registers and transfer elements) and a control path which provides control signals to the data path. The data path elements are actuated in timed sequence by the control path comprising a finite state machine (FSM) and control logic such as select, decode and enable elements.

FIG. 3 is provided to gain a further understanding of the distinctions between data path and control path. Data path 34, represents only a portion of the RTL modeled device. The other portion, or control path 36, is used to control values and events placed upon elements or components within data path 34. FIG. 3 illustrates data path 34 as a set of concurrent registers 38 controllable by enable circuits 40. Various other transfer devices, such as tri-state 42 and data bus 50 are shown. Arithmetic logic unit (ALU) 44 provides arithmatic Boolean operations under the timed direction of select devices 56. Each device, whether it is a ALU, register, MUX or tri-state, can be modeled within a larger model to form a hierarchial description of a system down to smaller component devices, and possibly down to the gate level. Data path 34 also may include various latch elements 52, wherein latch 52, registers 38, and tri-state devices 42 are enabled by enable circuit 40 within control path 36. Selection of input ports within each MUX is decoded by decoders 54, and ALU 44 functions are selected by select element 56. Proper timing of events and presentation of values is achieved within finite state machines (FSM) 58, embodied within the control path portion 36. FSM 58 comprises well-known principles of state machines, and includes a finite number of states 60, and transitions 62 of each associated state. State variables define values upon control bus 64 at select times or events. The values and events are transferred to select, enable and/or decode logic, where they are then used to control data flow within data path portion 34. Controlled data is then presented to data path 50 and transferred to other digital devices, not shown.

Current VHDL behavioral model only encompasses data flow within and through a data path. Data flow is directed by a control model which must be manually created and coded into VHDL language by updating, for example, the process statements, an exemplary process statement is shown above. It would be advantageous to provide modeling of both the data flow and control flow in a synergistic model, wherein changes to data flow model cause automatic changes to control flow model and vice versa. It would further be advantageous to represent both data flow and control flow in a behavioral description. A higher level behavioral description alleviates the disadvantage of detailed modeling often necessary in lower level structural descriptions. Thus, behavioral descriptions minimize the time and effort necessary to achieve thorough representation and modeling of the device. Still further, it would be advantageous to translate the behavioral description to a structural RTL description without requiring the user to manually update control parameters whenever data flow components change. It would still be further advantageous to provide a behavioral representation in graphic or object-oriented terminology thereby making initial representation user-friendly by avoiding textual representation associated with VHDL coding. It would be advantageous for the user to enter code using graphical icons, and to achieve a comprehensive RTL model from the icon description.

SUMMARY OF THE INVENTION

The problems outlined above are in large part solved by the improved computer-aided synthesis and verification methodology of the present invention. That is, the improved computer-aided methodology hereof represents behavioral characteristics of a digital device in an object-oriented (graphic) format. A "digital device" defined hereinbelow encompasses a singular circuit or a system of circuits interconnected to one another. A digital device also encompasses a singular procedure or a system of procedures interconnected to one another. A procedure is a software program necessary to carry out an operation. Thus, a digital device includes a combination of hardware and software components and/or procedures. Moreover, a digital device thereby includes any modular element which receives an input, performs an operation and achieves an output. The operation can be implemented in hardware, software or a combination thereof. A designer can use graphical icons as building blocks to describe behavioral aspects of a digital device to be modeled, and can, via the synthesis architecture hereof, reduce the behavioral description to an RTL structural description. The structural description includes an implementation for the hardware aspect in FSM and for the software aspect in a code structure. A designer can therefore build the model, modify the model, and verify the model at a higher level, behavioral level of abstraction and not be attentive to structural detail until after the behavioral model is set (verified). Simulation and verification is thereby performed from the graphical building blocks used to define the behavioral descriptive model. Each entry (icon entry and/or modification) into the behavioral model automatically updates and provides an RTL counterpart. Moreover, the synthesized RTL model includes both data path and control path features of the modeled device. Accordingly, the computer-aided synthesis and verification tool hereof initiates the modeling from a top-down approach beginning with a behavioral level and automatically synthesizes and verifies to a lower level structural description that fully encompasses not only the data path structure but also the Boolean expressions of timed control signals which operate upon the structure.

By synthesizing and verifying from a higher level, consistency is maintained between the behavioral aspects and the lower level structural aspects. The designer operates at the highest level of abstraction possible in order to reduce complexity of design modifications and entries. Moreover, pipeline designs and partitions can be incorporated into the modeling entries in order to support complex modeling of, for example, RISC pipelined processor architectures.

The present invention contemplates a method for graphically modeling a digital device. The method comprises the steps of providing a library of descriptors which behaviorally describe any digital device to be modeled. Symbolic icons representing at least two of the descriptors are placed upon a graphic display and are operationally connected. By selecting the placed icons, a pull-down menu associated with the selected icon allows the user to define a list of attributes for that icon. These attributes include both data path and control path information for a digital device graphically modeled from the placed icons.

Symbolic icons are displayed as a node upon the graphic display, and are selectable after placement such that each icon includes a menu-driven node form adapted for receiving user input of one or more attributes. The data path information attributes comprise hardware component (instance) type, input/output ports for each hardware instance, and functional specification for each instance. The control path information attributes comprise timing of signals sent to the data path and operation priority of hardware components arranged within the data path.

The present invention contemplates a method for graphically designing a digital device. The method comprises the steps of providing a library of descriptors which behaviorally describe any digital device to be designed. Next, symbolic icons representing at least two of the descriptors are placed upon a graphic display and operationally connected with an arc placed therebetween. Using a pull-down menu activated from the placed icons, a list of attributes are thereafter defined to the icons, wherein the attributes include both data path and control path information for a digital device graphically designed from the placed icons.

The present invention further contemplates a method for capturing a digital device as a behavioral description and for converting the behavioral description to a structural description. The method comprises the steps of constructing a behavioral description of a digital device upon a graphic display by graphically connecting a set of symbolic icons to each other. User-defined inputs are then mapped to each of the symbolic icons to define a graphical model having data path attributes of the digital device. The graphical model is represented as a matrix of data values corresponding to binary values at a plurality of internal states within the graphical model. A set of input values is then applied to the matrix of data values to modify the matrix and, simultaneous with rising edges of a clocking signal, the modified matrix is monitored at select internal states. Events at the select internal states are determined, and transitions of the events at the states between the rising edges of the clocking cycle are also determined. The events and transition of events are combined to produce a finite state machine having control path information. The control path information is merged with the data path attributes to produce a structural description of the digital device.

The present invention still further contemplates a method for capturing a digital device as a behavioral description, for converting the behavioral description to a structural description, and for verifying the behavioral and structural descriptions of the digital device. The behavioral and structural descriptions are verified by applying a set of input values to a matrix of data values to modify the matrix and produce a sequence of output values. The sequence of output values are monitored at an output state of the graphical model. The accuracy of the structural description is verified by comparing the output values at the output state resulting from the step of applying input values to the matrix with the output values at the output state resulting from the step of representing the structural description as a matrix of register-transfer level (RTL) data values.

BRIEF DESCRIPTION OF THE DRAWINGS

Other objects and advantages of the invention will become apparent upon reading the following detailed description and upon reference to the accompanying drawings in which:

FIG. 9 is a graphical pull-down menu of a register node form adapted to receive user-defined attributes according to the present invention;

FIG. 10 is a graphical pull-down menu of a distribute node form adapted to receive user-defined attributes according to the present invention;

Figure 1:
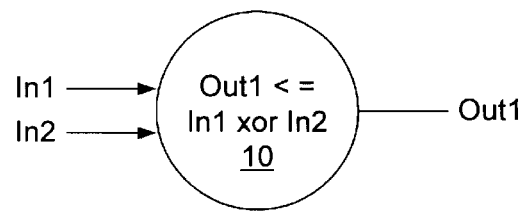
FIG. 1 is a block diagram of process (behavioral) level description according to prior VHDL language.
Figure 2:
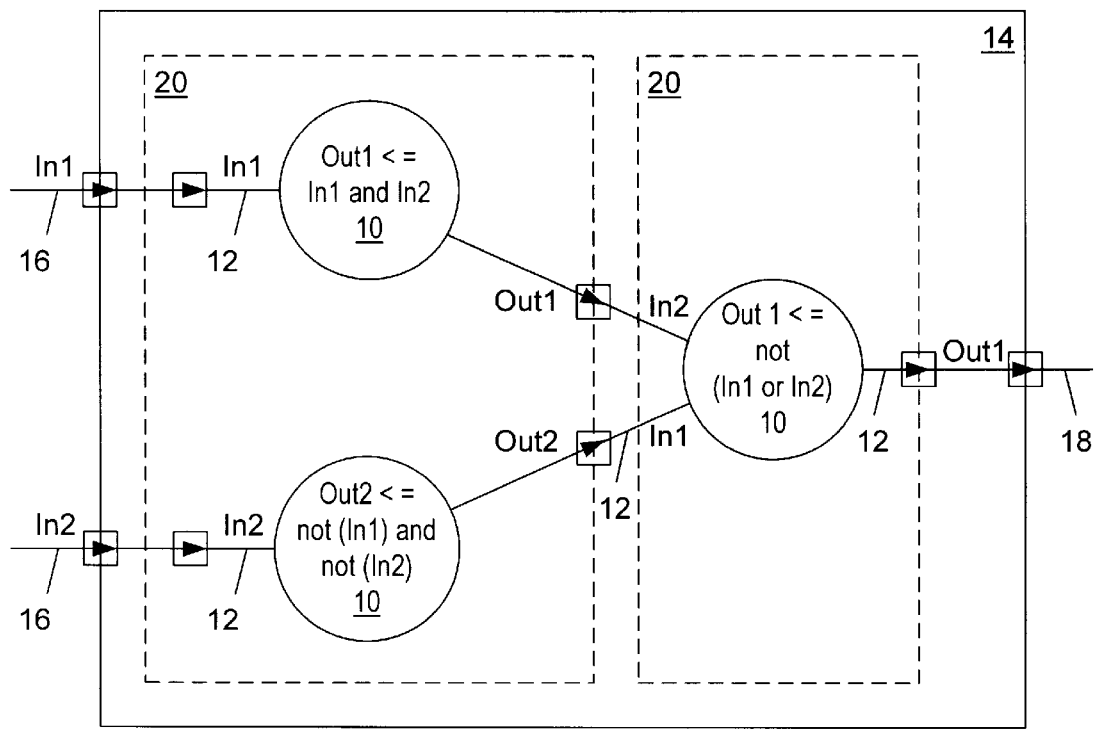
FIG. 2 is a block diagram of process (behavioral) level description interconnected with data pathways and ported at a structural level description according to prior VHDL language.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The computer-aided synthesis and verification tool hereof is used to generate an object-oriented behavioral model and convert the behavioral model to an RTL model, while utilizing control flow information and monitoring the control state through simulation. Previous synthesis tools which convert from a behavioral model to a structural model, such as that described in U.S. Pat. No. 5,222,030 (herein incorporated by reference), do not automatically translate behavioral description into a structural description, i.e., an RTL structural description which includes both data and control paths. Transferral from behavioral to structural description, while maintaining consistency (synergy) between data and control path information is important in obtaining a more accurate modeling technique. The present synthesis tool retains certain optimization decisions, such as operation scheduling and attribute allocations, with the user. The user provides the information in a readily used, graphical format. By graphically capturing the design at a data/control flow level, it can synthesize and generate an RTL-level model in a hardware design language which can, at the RTL-level, be readily recognized by those skilled in the art and mapped by existing simulators. Entry of behavioral data flow at an operational level allows the designer more freedom and creativity without burdening him or her with structural details. Structural description can then be automatically synthesized from the higher level behavioral description. The conversion or translation is performed automatically each time an operation is added or modified to the initial behavioral model. It is understood that modeling is achieved by interrelating data path components and operational signals to those components by combining data path and control path considerations. Thus, the behavioral description of a digital device is automatically converted to an RTL description having both data path and control path considerations—unlike prior tools which transfer only to a data path RTL level. The combination of data path and control path, and the interrelationship therebetween, shown in FIG. 4 is a synthesized outcome of the present tool.

Figure 4:
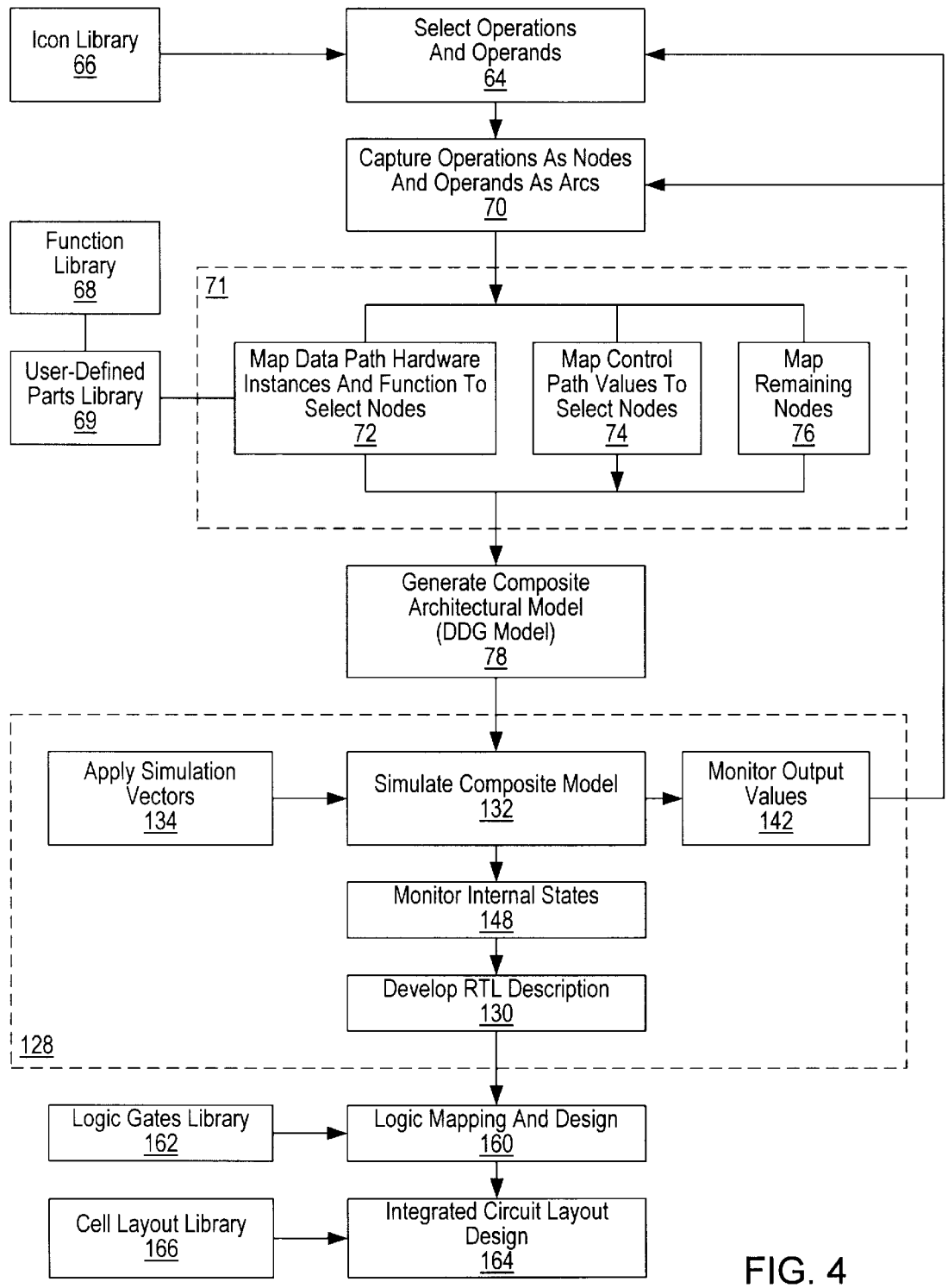
FIG. 4 is a flow diagram of computer-aided synthesis and verification of a digital device according to the present invention.

Referring now to FIG. 4, a flow diagram of a computer-aided synthesis and verification tool is shown. The tool begins by modeling behavioral/architectural design representations of a digital device. The digital device, as described above, can be as small as a transistor and can be as large as an entire computer hardware system. The digital device is determined to have certain operational characteristics. In particular, the device is described as a directed graph having a series of operations and operands connecting the operations. The operations can take multiple input operands and produce multiple outputs, which could be operands of other operations. The operations can take zero to finite time for their execution. Operations and operands, shown at block 64, are constructed and thereafter mapped to form what is defined hereinafter as a Data Dependency Graph (DDG). DDG assumes that each operation is to be atomic. Namely, an operation starts execution only after two conditions are met: (i) all the operands for the operation are available to that operation, and (ii) the current operation has completed its execution.

Each operation is represented in DDG as a node, and each operand as an arc which connects the nodes to one another. DDG, comprising numerous nodes (operations) and arcs (operands) formulate an entire modeling sematic for a digital device. Each node or operation is given a unique graphical icon symbolic of behavioral characteristics and, to some extent, structure of that operation. The icons are selected from an icon library 66 and interconnected in the DDG graphical display.

The DDG model takes on the computation model for hardware component behavior. For example, an add operation will only start computing after both the operands are available at the input of, for example, an arithmetic logic unit (ALU), and will produce the sum and carry outputs after pre-defined times. For correct use of the ALU component, new inputs should arrive at the input of the ALU component only after the completion of the previous computation upon the component. Representation for component behavior is therefore hierarchial. Complex/simple and large/small building blocks use the same generic and unified DDG behavioral representation. Modeling in DDG supports the three major types of hardware components including synchronous, asynchronous, and latching components.

It is understood that the operations or nodes specified in DDG are not structural components. Instead, nodes represent a function or operation, wherein each operation can be carried out by single or multiple components. An operation, modeled as an icon and selected from an icon library or set of icons, comprises a component having multiple input and output with structural, functional and timing characteristics. Each component can execute a function either concurrently or sequentially with other components and associated functions. Each function can occur at a different delay time and within one or more clock cycles. The function associated with a specific data-path component is coded in "C" language, and can be obtained from an extensible library of functions summarized in the following Table I:

TABLE I

| Function Name | Parameter | Description |
| --- | --- | --- |
| Storage Access Functions | | |
| 1. AL_Reg_Read | from_bit, to_bit | Returns data stored in the bit range |
| 2. AL_Reg_Wr | from_bit, to_bit | Stored in the bit range |
| 3. AL_RF_Rd | reg_index | Reads data value stored at the index |
| 4. AL_RF_Wr | reg_index, data | Writes data to location reg_index |
| 5. AL_Push | data | Pushes the data; updates stack pointer |
| 6. AL_Pop | | Pops data and updates stack pointer |
| 7. AL_Mem_Rd | row, col | Returns data from two dimension array |
| 8. AL_Mem_Wr | row, col, data | Writes data to two dimension array |
| Arithmatic Functions | | |
| 1. AL_Add | a,b | Signed addition of two numbers a+b |
| 2. AL_Sub | a,b | Signed difference of two numbers a−b |
| 3. AL_Inc | data | Returns data+1 |
| 4. AL_Dec | data | Returns data−1 |
| 5. AL_Mul | a,b | Returns signed a*b |
| 6. AL_Div | a,b | Returns error if b==0; else signed a/b |
| Logical Functions | | |
| 1. AL_LS | data | Left shift by 1 |
| 2. AL_RS | data | Right shift by 1 |
| 3. AL_LS_W1 | data | Left shift by 1, insert 1 at LSB |
| 4. AL_RS_W1 | data | Right shift by 1, insert 1 at MSB |
| 5. AL_RL | data | Rotate left by 1 |
| 6. AL_RR | data | Rotate right by 1 |
| 7. AL_Or | a,b | Logical OR (a\|\|b) |
| 8. AL_And | a,b | Logical AND (a&&b) |
| 9. AL_Xor | a,b | Logical XOR |
| 10. AL_Nand | a,b | Logical NAND |
| 11. AL_LT | a,b | Return 1 if a<b else 0 |
| 12. AL_EQ | a,b | Returns 1 if equal else 0 |
| 13. AL_GT | a,b | Returns 1 if a>b else 0 |
| 14. AL_NE | a,b | Returns 1 if unequal else 0 |
| 15. AL_LE | a,b | Returns 1 if a<=b else 0 |
| 16. AL_GE | a,b | Returns 1 if a>=b else 0 |

TABLE I-continued

| Function Name | Parameter | Description |
|---|---|---|
| 17. AL_LTU | a,b | Returns 1 if unsigned (a)<unsigned (b) |
| 18. AL_GTU | a,b | Returns 1 if unsigned (a)>unsigned (b) |
| 19. AL_LEU | a,b | Returns 1 if unsigned (a)<=unsigned (b) |
| 20. AL_GTU | a,b | Returns 1 if unsigned (a)>=unsigned (b) |
| 21. AL_BUS_TR | a | Returns input value |
| Bit Operation Functions | | |
| 1. AL_BNot | a | One's complement of a |
| 2. AL_BAnd | a,b | Bitwise AND (a and b) |
| 3. AL_BOr | a,b | Bitwise or (a/b) |
| 4. AL_BX Or | a,b | Bitwise xor (a b) |

Functions taken from function library 68 are selected by the user and placed in a parts library 69. Parts library 69 for an exemplary parallel shifter is shown below in Table II. Each part contains input and output ports, functions taken from function library 68 delay parameters, etc. Parts library 69 therefore contains functional descriptions as well as structural and timing descriptions necessary to effectuate mapping of DDG nodes to selected parts from the library.

Once operations are associated with nodes and operandi to arcs, as shown in step 70, each node must have certain information mapped to it. The mapping operation requires appropriate selection of hardware components for each of the node operations. The DDG representation must be refined so that the operation required by a specific node matches the operation performed by the corresponding hardware component. At each operation, the user defines the following specifications: (i) hardware components (or "instances"), (ii) mapping of DDG nodes to those hardware instances, and (iii) selection of priority value for the operations sharing a hardware instance. A result of shared hardware instances for multiple operations is a possible conflict in the scheduling of input signals sent to the respective instance. In case of conflict, the user can define priority values for each operation. Shared async hardware instances are scheduled on clock edges and multiplexers are introduced into the data path prior to signals received on these instances. Multiple unshared async hardware instances can be scheduled within a clock cycle to allow chaining together of those instances.

Mapping of user-defined part information to the DDG model begins by mapping 71 of various hardware instances, values and priorities to select nodes. Data path hardware instances are therefore mapped to operational nodes, as shown in block 72. Various functions, shown above in Table I, are taken from functions library 68 and input to those nodes having a functional requirement. Other nodes which do not have a functional meaning, but which carry control specifications similar to those of a control flow path are mapped in block 74. Mapping of information (i.e., control path values) to select control nodes, allows the user to define an architectural control model for the data path hardware instances defined in block 72. The remaining nodes, such as subgraph, junction/sinks, in/out and comment nodes (defined hereinbelow) are mapped, as shown by reference numeral 76, to complete the mapping operation 71 of user defined information to a DDG architectural model.

Mapping operation 71 is readily achieved by the user capturing functionality in a graphical and declarative form. The mapped nodes and user-defined information (attributes) at each of these nodes, including function derived from a function library, hardware instances, input/output configuration for each instance, input signal values, etc., is completed to generate a composite architectural model, shown at step 78. The architectural model captures the advantages described above necessary to synthesize an RTL data path netlist, including all the multiplexers and associated logic (FSM) information.

Figure 5:
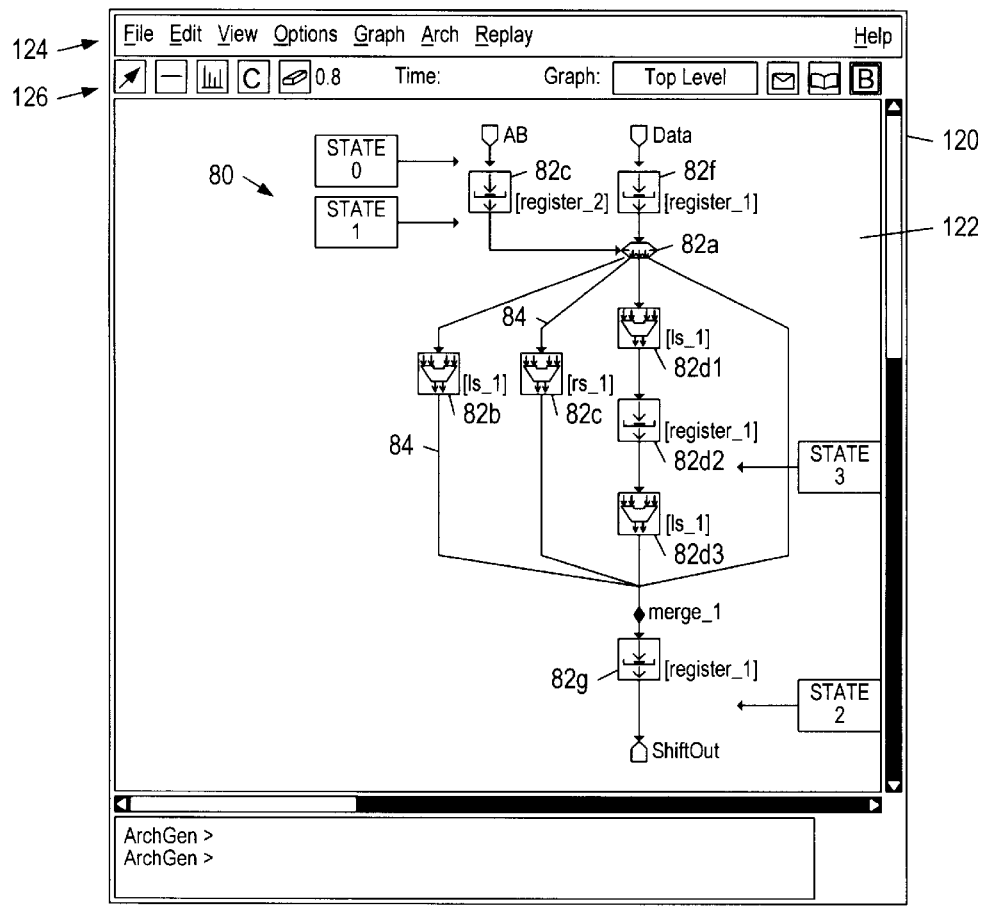
FIG. 5 is graphical, object-oriented representation of an exemplary parallel shifter digital device according to the present invention.

At this juncture, graphical capture of operations 70, mapping 71 to the DDG nodes, and generation of architectural model 78 is best illustrated by an example. If the digital device to be modeled is a parallel shifter, then a graphical user interface (GUI) of the DDG nodes for the parallel shifter is shown in FIG. 5. The exemplary parallel shifter is controlled by values AB. The operation of the shifter is performed based upon the value of AB as follows:

| AB | Operation |
|---|---|
| 00 | left shift |
| 01 | right shift |
| 10 | double left shift |
| 11 | no shift |

The hardware instances for performing left shift, right shift and register are available in pre-defined parts library 69 shown in FIG. 4. The designer has discretion in choosing each hardware instance and minimizing the number of hardware elements (instances) to be used. In the example provided, only one left shift, one right shift and two registers are required. The left shift component (hardware instances) is marked as [ls_1], the right shift instance is marked as [rs_1], and the registers are marked as [register_x] (wherein x equals 1 or 2). The following Table II illustrates descriptions of the components and the body of "C" functions (a listing of C functions is provided above) as they appear in the parts library:

TABLE II

```
Part register sync
    inport              data_in[8]
            setup       4.0
    outport             data_out[8]
            function    AL_Reg_WR
                        delay 2.0
                        param data in
Part ls          async
    inport              shift_in[8]
    outport             shift_out[8]
            function    AL_LS
                        delay 24.0
                        param shift_in
Part rs          async
    inport              shift_in[8]
    outport             shift_out[8]
            function    AL_RS
                        delay 12.0
                        param shift_in
TOOL_FUNC           AL_Reg_WR (data, reg)
    INTEGER         data;
    INTEGER         *reg;
{
    return ((*reg)=data);
}
TOOL_FUNC           AL_LS(data)
    INTEGER         data
{
    return (data<<1);
}
```

TABLE II-continued

```
TOOL_FUNC      AL_RS(data)
  INTEGER      data
{
   return (data>>1);
}
```

The following represents specifications and hardware instances used by the architectural model chosen:

partition default 0.0 20.0 40.0
   instance register_1 register
   instance register_2 register
   instance 1s_1 1s
   instance rs_1 rs FIG. 5 illustrates DDG model 78 for the exemplary parallel shifter. DDG 78 is graphically shown comprising a series of operations or nodes, each node having a unique icon 82 representing node functionality. Icons 82 are connected by arcs 84. There are two input nodes AB and data, and an output node Shiftout. The diamond-shaped icon 82a distributes data input to different branches (either icon 82b, icon 82c, or icon 82d1) or is passed directly to merge_1 node, based on the value of AB input. Storage of temporary values are modeled by storage or register icons 82d2, 82e, 82f and 82g. Register 82f stores data input, register 82e stores control values AB, while register 82d2 stores left shift value from its corresponding branch prior to subsequent shift to register 82g, where the resulting value is sent as Shiftout.

The names enclosed in brackets indicate the mapping of the particular icons or nodes to physical hardware instances. In this case, two registers, a left shift and a right shift hardware instance are necessary to model the parallel shift operation and data flow. If control signals AB are 00, then data flow will proceed through node 82b. If AB value is 10, then data flow will proceed through node 82c. If AB value is 01, then data flow will proceed through node 82d (including 82d1, 82d2, and 82d3). Finally, if AB value is 11, then no shift occurs and data will be sent directly to merge_1 node.

DDG model 78 of the exemplary parallel shifter is described as a behavioral connection of functional icons or odes 82 illustrating shift operations on input data corresponding to select values of control signal AB. Once he parallel shifter is modeled as a behavioral description, nd each node is assigned by the user, a specific characteristic (timing and port input/output) can be synthesized and produced as an RTL listing shown below:

Data Path:
   Total number of arcs in Data Path: 11

| Arc Num | Src Inst | Src Port | Des Inst | Des Port |
|---|---|---|---|---|
| 0 | AB | oport_0[1:0] | MUX_0 | iport_0[1:0] |
| 1 | Data | oport_0[31:0] | MUX_1 | iport_0[31:0] |
| 2 | register_1 | data_out[31:0] | 1s_1 | shift_in[31:0] |
| 3 | 1s_1 | shift_out[31:0] | MUX_1 | iport_1[31:0] |
| 4 | register_1 | data_out[31:0] | Shiftout | iport0[31:0] |
| 5 | register_1 | data_out[31:0] | rs_1 | shift_in[31:0] |
| 6 | rs_1 | shift_out[31:0] | MUX_1 | iport_2[31:0] |
| 7 | register_1 | data_out[31:0] | MUX_1 | iport_3[31:0] |
| 8 | MUX_0 | oport_0[1:0] | register_2 | data_in[1:0] |
| 9 | register_2 | data_out[1:0] | MUX_0 | iport_1[1:0] |
| 10 | MUX_1 | oport_0[31:0] | register_1 | data_in[31:0] |

Total number of MUXs added: 2

| MUX Name | Num of Input Ports |
|---|---|
| MUX_0 | 2 |
| MUX_1 | 4 |

1. Logical Expressions for MUX Input Ports:
   Total number of condition variables: 2

| Cond Index | Cond Name |
|---|---|
| 0 | dValid[0:0] |
| 1 | register_2_data_out[1:0] |

Logical Expression for MUX: MUX_0 and Input Port: iport_0

| State | Condition |
|---|---|
| 0 | ( 1 d ) or |
| 2 | ( 1 d ) |

Default selected port for MUX (MUX_0_: Input Port (iport_1)

Logical Expression for MUX: MUX_1 and Input Port: iport_0

| State | Condition |
|---|---|
| 0 | ( 1 d ) or |
| 2 | ( 1 d ) |

Logical Expression for MUX: MUX_1 and Input Port: iport_1

| State | Condition |
|---|---|
| 1 | ( 0 0 ) or |
| 1 | ( 0 2 ) or |
| 3 | ( 0 d ) |

Logical Expression for MUX: MUX_1 and Input Port: iport_2

| State | Condition |
|---|---|
| 1 | ( 0 1 ) |

Logical Expression for MUX: MUX_1 and Input Port: iport_3

| State | Condition |
|---|---|
| 1 | ( 0 3 ) |

2. FSM State Transitions:
   Total number of arcs in FSM: 9

| Arc Num | Cur State | Next State | Condition |
|---------|-----------|------------|-----------|
| 0 | 0 | 1 | ( 1 d ) |
| 1 | 1 | 2 | ( 0 0 ) |
| 2 | 2 | 1 | ( 1 d ) |
| 3 | 1 | 2 | ( 0 1 ) |
| 4 | 1 | 3 | ( 0 2 ) |
| 5 | 3 | 2 | ( 0 d ) |
| 6 | 1 | 2 | ( 0 3 ) |
| 7 | 2 | 0 | ( 0 d ) |
| 8 | 0 | 0 | (0 d ) |

Total number of states in FSM: 4
state 0: Idle State
state 1: Node: LatchAB (instance name: register_2)
   Node: StoreData (instance name: register_1)
state 2: Node: StoreResult (instance name: register_1)
state 3: Node: StoreLS (instance name: register_1)
3. Logical Expression for Output:
   External Output Port: ShiftOut

| State | Condition |
|-------|-----------|
| 2 | (d d ) |

4. Schedule Table:

| state num | register 1 | register 2 | ls 1 | rs 1 |
|-----------|------------|------------|------|------|
| 0 | — | — | — | — |
| 1 | AL_Reg_Wr | AL_Reg_Wr | AL_LS | AL_RS |
| 2 | AL_Reg_Wr | — | — | — |
| 3 | AL_Reg_Wr | — | AL_LS | — |

Figure 6:
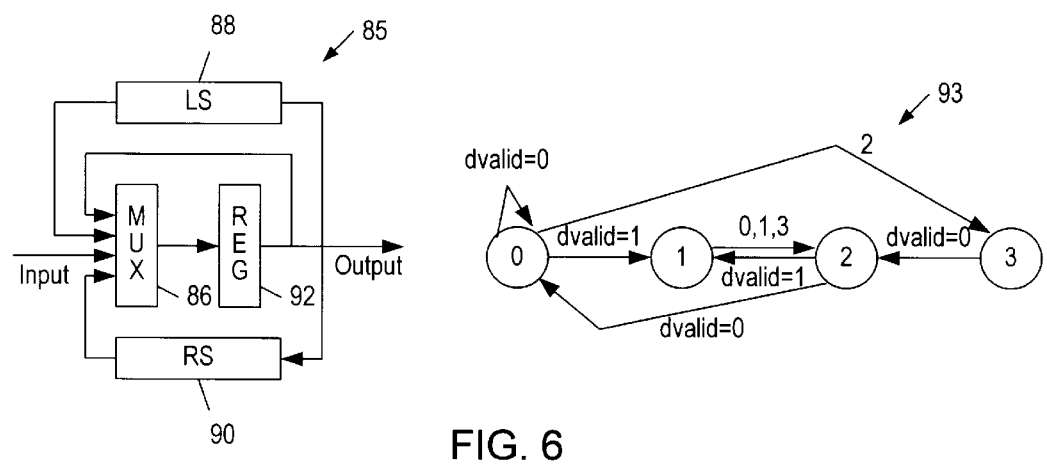
FIG. 6 are data and control paths of the parallel shifter digital device graphically displayed in FIG. 5.

The above RTL listing contains a structural view of the design for both data path 85 and control path 93 for the parallel shifter, which are graphically illustrated in FIG. 6. The data path contains a multiplexer (MUX) 86 which is not shown in the GUI user-input features of FIG. 5. Nonetheless, MUX 86 is part of the data path and is automatically synthesized after DDG mapping has occurred and the composite architectural model is achieved. MUX 86 multiplexes input values, either from input, left shift 88, right shift 90 or register 92, and places those values into register 92. Register 92 sends the last value as output signal and additionally feeds back the output signal to left shift, right shift and multiplexed elements to represent a complete data path (without control) of the exemplary parallel shifter.

Control path 93 within a parallel shifter is represented as a state machine diagram. State 0 is the state at data input node, state 1 is the state at register node icons 82f and 82e; state 2 is the state at register icon node 82g; and, state 3 is the state at the input to register icon node 82d2. Whenever valid data is received at the data input node, it is stored at register node 82f, and the state is transmitted to state 1 from state 0, as shown. If control values AB are either 0, 1 or 3, then data will traverse through left shift function nodes 82b, 82c or directly to the input of register node 82g. If data is valid, and AB values are 2 instead of 0, 1 or 3, then data will transfer directly from state 0 to state 3 (input) to register node 82d2, as shown.

It is appreciated from comparing FIGS. 4, 5, and 6, that operation icons selected from an icon library, and the interconnection of icons and mapping of icons in a data and control path can produce a composite architectural model 78.

Architectural model 78 includes functions selected from a function library 68 and mapped to select function nodes defined in the icon library. The RTL descriptions and listings shown above are synthesized as a direct result of the DDG behavioral description of FIG. 6 and correlate with both data path 85 and control path 93 models in FIG. 6.

Figure 3:
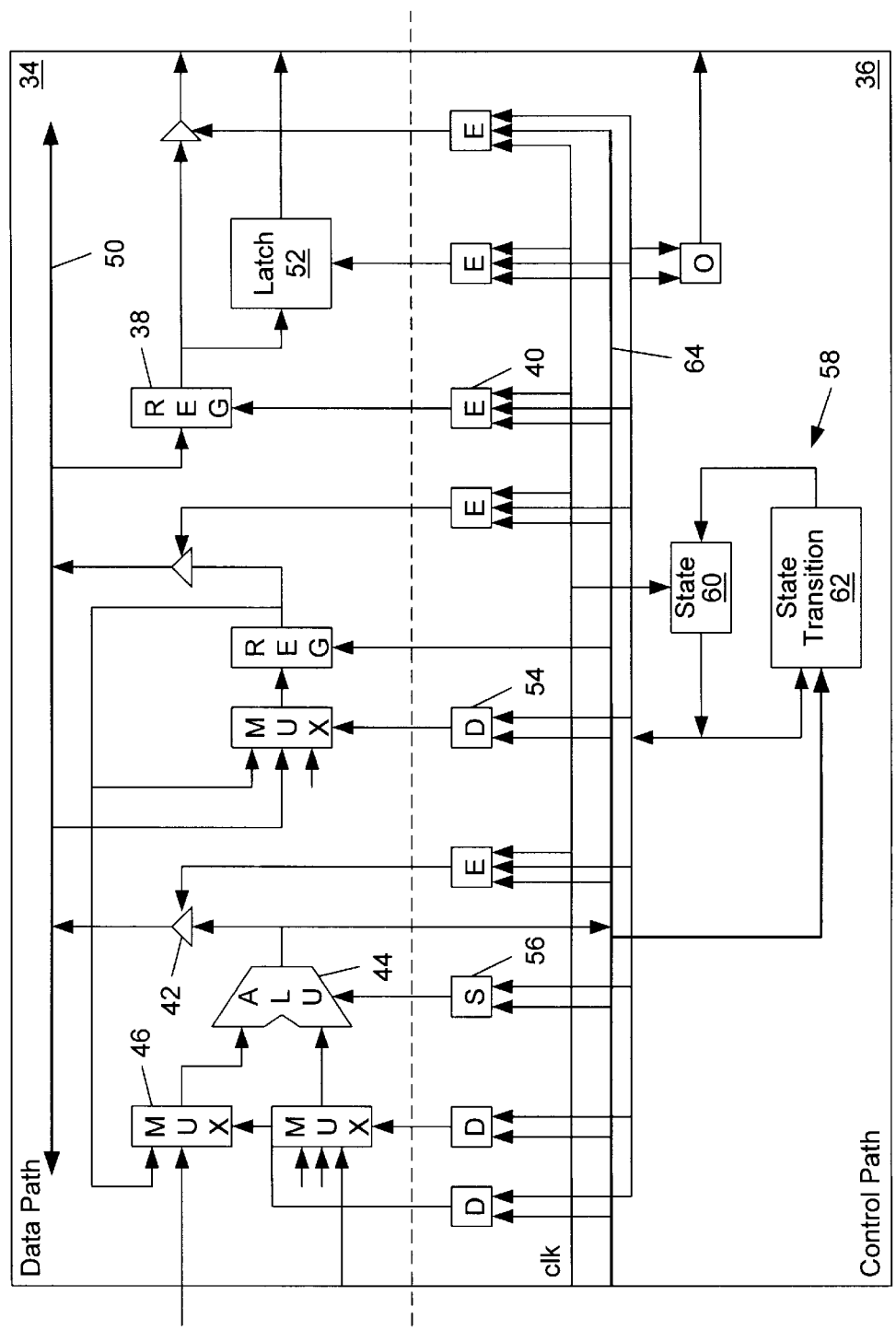
FIG. 3 is an RTL (structural) level description of data and control paths, and the interrelation between data path and control path.
Figures 7, 8:
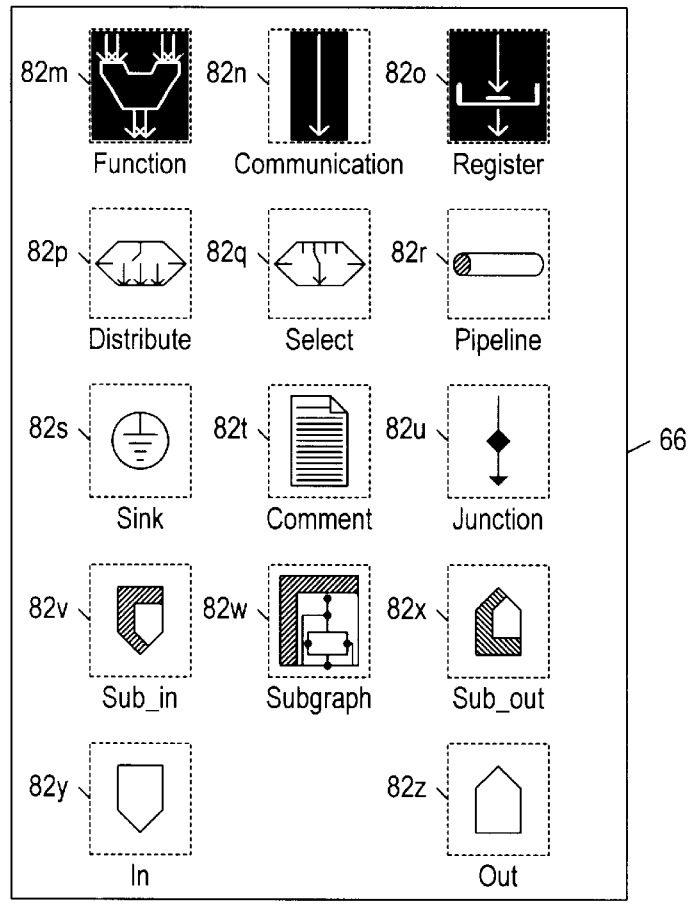
FIG. 7 is a library listing of icons used to graphically represent any digital device at a behavioral level according to the present invention.
FIG. 8 is a graphical pull-down menu of a function node form adapted to receive user-defined attributes according to the present invention.

A description of each and every operation at various nodes within DDG model 78 can be represented as a set of icons 82. Icons 82 are selected from icon library 66 depending upon the desired functionality required. Icon library 66 contains 14 possible icons 82 shown in FIG. 7. FIG. 7 illustrates library 66 containing three darkened icons: function icon 82m, communication icon 82n and register icon 82o. The darkened icons represent specific components within the RTL description data path described above in FIG. 3. Function icon 82m represents function operations such as those performed by an ALU. Multi-function operations can be performed within a single function icon. Each of these functions can vary in number of input parameters, but each of these functions produce only one output. Furthermore, each function can take different times for execution. FIG. 8 illustrates user-defined information necessary to complete the specification for the function icon.

As shown in FIG. 8, function icon 82m can be represented in a function node form 99 having up to five inputs. Each input has an input port 94. Furthermore, each output can have multiple functions and can be independently mapped 98 to a unique function taken from function library 68. The function icon, shown in FIG. 8, is illustrated having a AG_LS (left shift function) operation mapped to a hardware instance titled ls_1. Thus, the first specified component having shift_in and shift_out input and output, respectively, is the operation defined as node 82b in FIG. 5. Various other functions of the hardware instance can also be defined for the instance and mapped to node 82b, if desired. However, for the example shown in FIG. 8, only one function is defined and mapped thereto.

Function operation or node shown in FIG. 8 is the node form for only one icon 82m taken from icon library 66, shown in FIG. 7. The communication icon 82n is representative of a generic communication path among multiple sources and destinations within the data path. Data bus communication is modeled by communication icon 82n. Data transfer on the data bus takes place at the falling edges of the clock signal, while data is stored in the storage devices on the rising edges of the clock signal. Mapping of delay time is achieved by completing a communication node form having similarities to the function node form shown in FIG. 8. Register icon allows the user to define read and write operations for registers and latches within the data path. The register icon or node can have multiple input ports and one output port for write operation and one input port and multiple output ports for read operation. Each port refers to a range of bits to be read or written to the selected register or latch hardware instance. The ranges are entered graphically by the user into the register node form 100 shown in FIG. 9. Register node form 100 illustrates exemplary begin and end bits for three ports. Up to five ports can be defined with begin and end bits as well as selection of read or write register type.

Register operation using a read register is capable of reading the values in the bit range defined in the register node form 100, and the arcs departing the nodes carry these values. For a write operation, multiple input carry the values in mutually exclusive bit ranges. After all the inputs arrive at the node, write to all of the fields is performed at the next positive edge of the clock. Multiple register nodes writing to the same register are scheduled sequentially based upon the priority values defined in the register node form 100. Read operations take virtually no time to perform and write operation is synchronized to the partition positive clock edge.

Figures 9, 10:
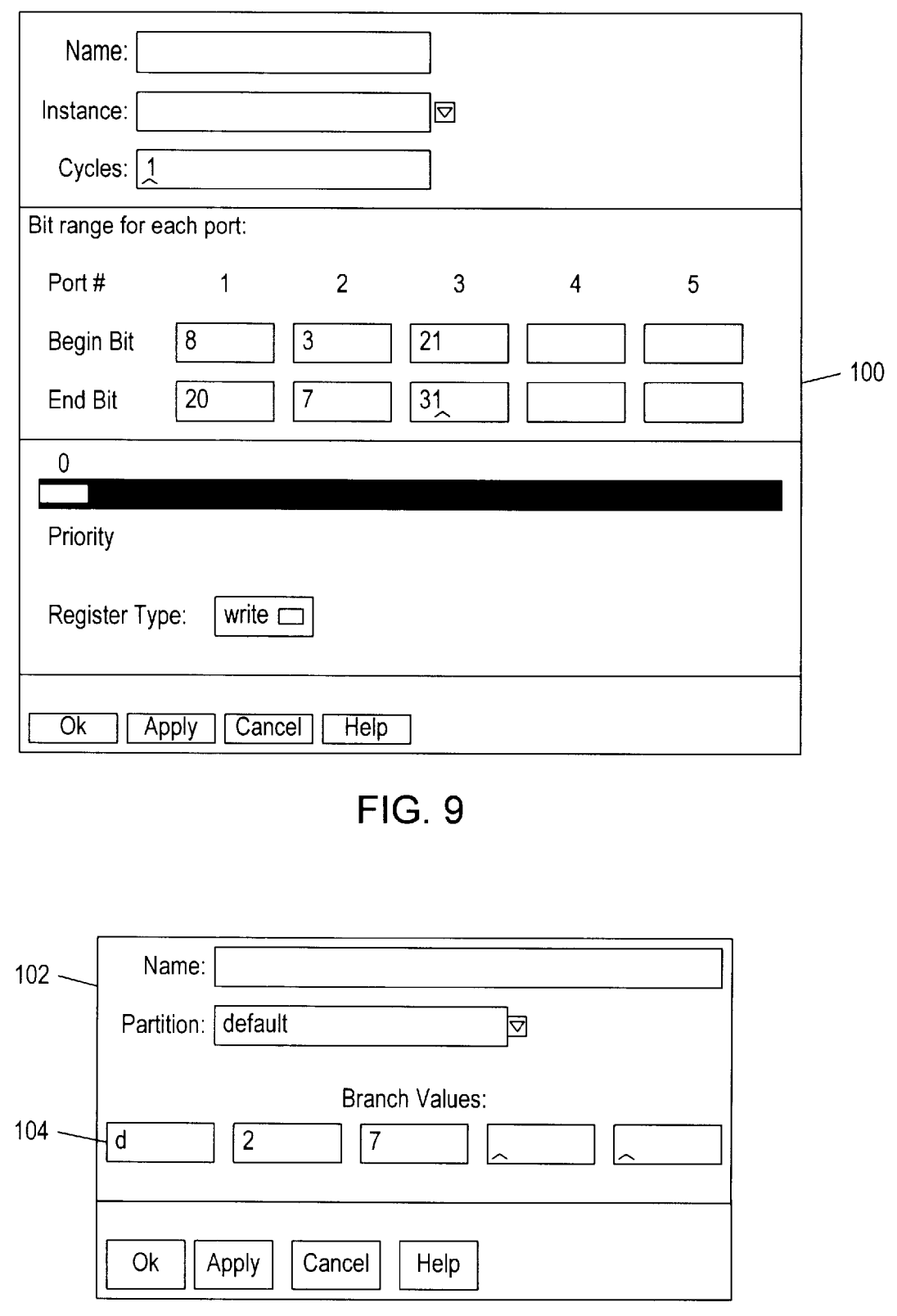

Data path icons which include function 82*m*, communication 82*n* and register 82*o* icons are mapped by the user by completing or "filling-in" entries into the function, communication and register node forms. Function node form 99 and register node form 100 is illustrated above as examples of graphical representations for allowing the user to readily complete various aspects of operation. Control path is also defined similar to the data path of function, communication and register. Control path is described as a select icon 82*q*, pipeline icon 82*h* or distribute icon 82*p*. Control modeling can be of two types. First, control is based on the arrival of multiple events, one of which is a control signal. The action is based on the value of the arriving control signal. Second, control modeling is based on only the arrival of multiple events and not on the values. Arrival of multiple events and/or the values can be explicitly defined and mapped by the user to the select icons, pipeline icon or distribute icon node forms. An exemplary distribute node form 102 is shown in FIG. 10. The user selects data routing by mapping data ports to the value of the control input. The select node has a control input, multiple data input ports and a single output port. A data input is selected based on the value of the control input variable. If data arrives at an input port which is not selected, it waits until the control signal with the specific value appears on the control input. The distribute node is similar to the select node, but has a single data input port and multiple data output ports. Thus, distribute node form 102, shown in FIG. 10 is similar to select node form except that multiple output ports are defined instead of multiple input ports. Multiple output ports, shown as branch values, are illustrated by reference numeral 104. FIG. 5 illustrates a select icon 82*a* which places multiple input values to a single output value. Conversely, a distribute icon will take multiple input values and branch those values to a single output.

Figure 11:
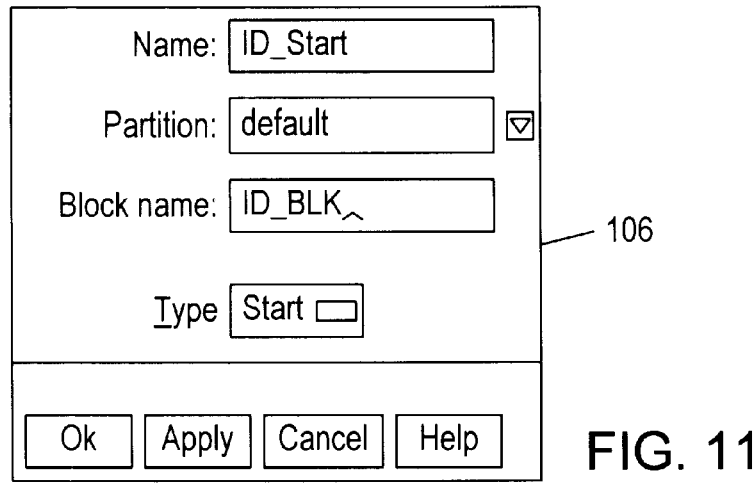
FIG. 11 is a graphical pull-down menu of a pipeline node form adapted to receive user-defined attributes according to the present invention.

Referring to FIG. 4, mapping of data path hardware instances and functions to select nodes at step 72 is performed by the user completing function node form 99, a similar format communication node form and a register node form 100. Various functions are taken from the function library defined above and entered or mapped to the output function locations 98 within function node form 99. Likewise, the user can map control path values at step 74 to select nodes which define the control path. The control path nodes are represented by distribute, select and pipeline icons, and mapping to those node is performed by user input to distribute node form 102, a similar format select node form, and pipeline node form 106 shown in FIG. 11. Pipeline node 82*h* allows synchronized parallel activities. The number of input ports and output ports for the pipeline node is the same and these ports represent the data crossing a processing section. When the last data input arrives at this node, all the waiting outputs depart simultaneously. The pipeline node can be used for synchronization. As shown in FIG. 11, pipeline node form 106 has three attributes: start, end and sync which customizes the pipeline node usage. For the selected attribute of start or end, the user is required to enter a block name as shown. For sake of brevity, communication and select node forms are not illustrated. However, it is understood that similar node forms, having similar functions, have formats similar to those shown.

Other nodes can be mapped by the user to perform select operations. These operations are represented as sink icon 82*s*, comment icon 82*t*, junction icon 82*u*, sub__n icon 82*v*, subgraph icon 82*w*, sub__out icon 82*x*, in icon 82*y* and out icon 82*z*. These icons or nodes perform user-select operations and are not limited to the data path or control path. The junction node takes two forms: single-input and multiple-output represents a fan-out operation, whereas multiple-input and single-output represents a fan-in operation. Single-in and single-out junction node can be used as an intermediate node to connect nodes. The arcs departing from the distribute icon or node, in general, will enter one or many junction nodes after they traverse through other nodes. The junction node is used to route multiple arcs through one node just like wire-or or hardware design. It has multiple inputs and a single output. Inputs depart immediately to the output irrespective of arrivals of any other inputs. The sink node provides a mechanism to terminate an activity. Hardware designers initiate multiple speculative activities and terminate the ones which are not required. This normally results in reducing the clock period and hence provides higher performance design. This design style can be modeled by a combination of junction and sink nodes or icons. Junction and sink icons or nodes are represented and mapped at step 76, shown in FIG. 4.

Figure 12:
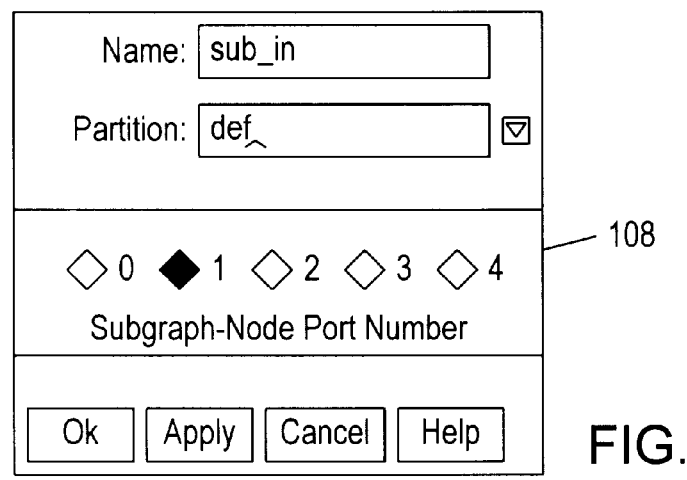
FIG. 12 is a graphical pull-down menu of a sub_in node form adapted to receive user-defined attributes according to the present invention.
Figure 13:
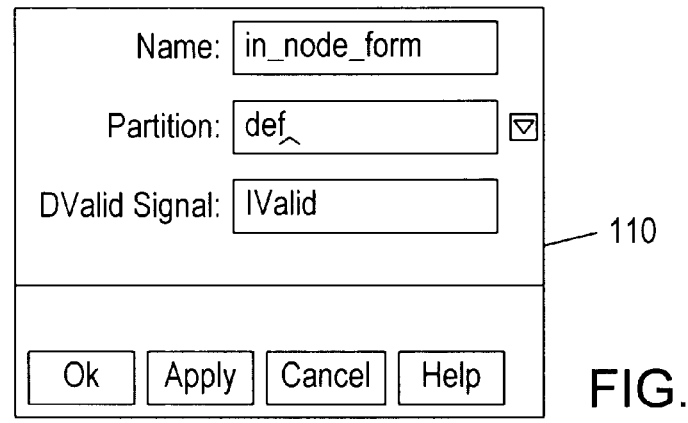
FIG. 13 is a graphical pull-down menu of an in node form adapted to receive user-defined attributes according to the present invention.

Other nodes besides junction and sink, which fall within category 76, shown in FIG. 4, include subgraph nodes, in/out nodes and comment nodes. Subgraph node or icon includes sub__in and sub__out. Sub__in and sub__out nodes or icons provide the connection mechanism across the graph hierarchy. The subgraph node can have multiple input ports and multiple outports. The subgraph node is included in the modeling mechanism hereof to manage graph complexity by grouping a set of nodes and giving this set a name. FIG. 12 illustrates sub__in node form 108. The user selects a number in this form to define the order of connections used in the corresponding subgraph node. The increasing number, by convention, denotes the order from left to right. Similar form exists in the sub__out node form, not shown. In node and out node icons represent external pins of the digital device. The external stimulus for system tests binds values to the input nodes and monitors the output nodes for the response. A digital device can have multiple input and output nodes. Each input node can have only one output arc and no input arc. Similarly, each output node can have one input arc and no output arcs. FIG. 13 illustrates in node form 110. A user is allowed to specify the name of the control signal for the validity of the signals. In the example shown, the control signal is designed "dvalid". A set of input signals can be associated with one control signal. These names are used in the RTL model. For each output node a distinct control signal name is specified by the user, which is also used in the RTL model. Lastly, the user can define certain comments via a comment node or icon. The comment node or icon allows the user to place comments anywhere in the DDG model represented as a graphical user interface screen. This node is included for purposes of user documentation and has no impact on simulation or simulation results.

FIGS. 8–13 represent node forms which can be user-defined so as to map data path hardware instances, control path values, timing priority and all remaining nodes and/or operations within the ensuing DDG model. Thus, the DDG model is defined by connecting nodes and arcs as well as defining characteristics of each node or icon. Data path specification and control path operation upon the data path is therefore represented as a composite architectural model, shown as process step 78 in FIG. 4. Each exemplary node or icon shown in FIG. 5 thereby represents a user-defined operation set forth by user input at the corresponding node form for each node. Certain exemplary user-defined parameters for the parallel shifter of FIG. 5 is illustrated in the node forms of FIGS. 8–13. It is understood, however, that the numerous parameters/attributes such as hardware instance name, signal name, block name, etc. can be wholly and independently defined by the user, whereas function mapping is defined by selection from user-defined parts library 69. It is also understood that nodes and arcs, shown in FIG. 5, can be moved and rearranged according to user specification. Moreover, the attributes associated with each node form remain with the corresponding node regardless of where that node is moved within the graphical screen area. Thus, nodes, arcs and comments may be readily selected, and the attributes associated with those objects also selected and moved in an object-oriented manner. Manipulating the objects instead of attributes of each object allows the user freedom to become more creative, freely edit and command changes to the model without having to re-enter or re-translate attributes to each edited or moved object. The entire listing of objects is defined and illustrated in FIG. 7 to capture all behavioral aspects of a high level graphical user interface descriptive model.

Graphical user interface (GUI) facilitates the capture of DDG and mapping of user-defined specifications in the various node forms to hardware instances. GUI main window is shown in FIG. 5 and is referenced as numeral 120. GUI 120 consists of a main window containing a drawing area 122. The main window and pull-down menus arranged at the upper left corner of GUI 120 allows a user-friendly atmosphere for designers to (i) create nodes in which various icons are placed and to (ii) connect arcs between the nodes within drawing area 122. Details as to menu area 124 and functionality of each of the pull-down menus as well as the tool features 126 are documented and presented in the USERS MANUAL appended hereto. The USERS MANUAL sets forth the features of the menu and describes how a user can navigate within the pull-down menu 124. A "replay" feature allows the user to monitor resulting time values at each node. The time values can be charted within the diagram. The current data values are displayed along with their associated arcs, and the current time value is displayed in the middle of tool bar 126, as shown. The appended USERS MANUAL describes the replay feature as well as the methodology by which one or more objects can be selected, deleted, moved, created, etc. in order to allow the user access to redesign and monitor of a current DDG model.

Figure 14:
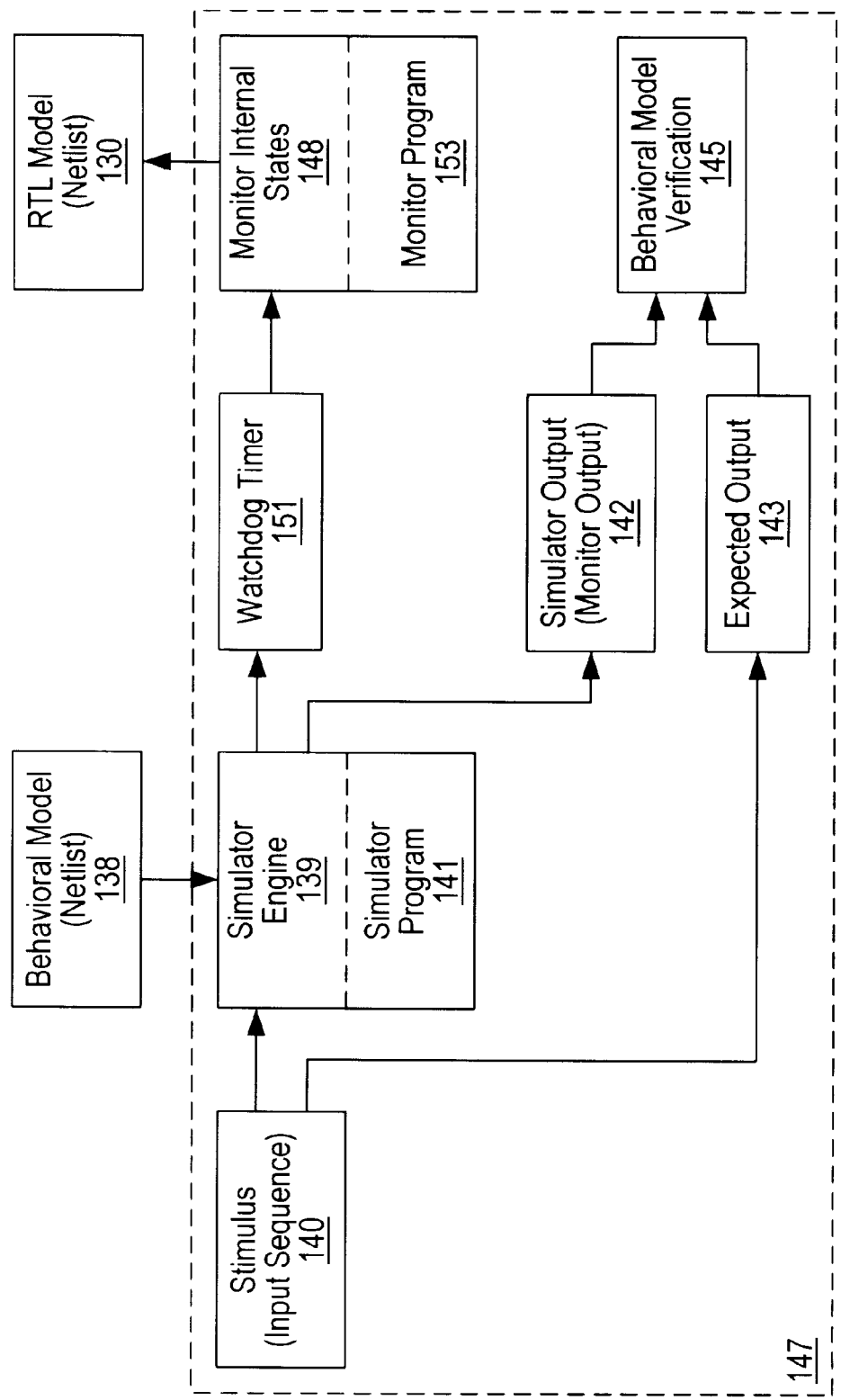
FIG. 14 is a flow diagram of simulation steps for converting a behavioral model netlist to an RTL model netlist and for verifying the behavioral model.

FIG. 4 illustrates process steps 70 and 71 for capturing a DDG description and for mapping data and control path values to nodes within the description, respectively. A composite architectural model (DDG model) is generated once the user has defined (i.e., mapped) specific attributes by inputting those attributes within the pull-down menu of the GUI. The attributes describe behavioral characteristics of each node necessary to present a composite model 78. Composite model 78 must then be verified and reduced to a structural RTL model, as shown in FIG. 14. FIG. 4 illustrates process steps 128 and the methodology in which DDG model 78 is reduced to an RTL description 130. RTL description/model 130 is formed by simulating the composite model 132 with simulation vectors 134 and, based upon the resulting output sequence values 142, the behavioral (DDG) model can be verified. Moreover, monitoring of internal states 148 of the device at clock edges is performed to develop an RTL model 130. Further details regarding simulation procedure 128 are provided in FIG. 14.

Once the user has defined the attributes within the node forms, he or she can then store the resulting output within a textual file. Textual representation is fully described in the USERS MANUAL. Features relating to file mapping and component description are shown below as created by the DDG model:

| | |
|---|---|
| CPU.ddg | DDG with mapping |
| CPU.part | Data with part definitions |
| CPU_func.c | Body of the user-defined functions |
| CPU.arch | Clock and instances definition for each partition |
| CPU_test.c | Custom test program containing input stimulus |
| CPU.in | Sequences of input vectors (user-defined name) |

Hardware instances or "parts" are defined in the file .part, which contains an external behavioral description of the part types used in the data path. It includes structural properties of parts, including input and output port definitions, sizes, timing and functional behaviors. This file uses the names of the functions which are defined either in the Tool function file or the user defined CPU_func.c file. The syntax for the parts file (.part) is textually described from the DDG model as follows:

```
part<type name>[async | sync | latch]
    {storage <x dimension size><y dimension size>}
    inport <inport name><port size>
        setup    <time>
        :
    :{cntport ,cntport name><port size>}
    :
    outport <outport name><port size>
        function <function name>
            {param <mapped inport name>}
            :
            {sel_func    <cnt port name> <integer>}
            delay    <time>
            :
        :
    :
```

There are three types of parts: async, latch and sync. Sync components are registers. Async parts or hardware instances can have multiple functions, can take multiple cycles for execution, and can have storage.

Functions are defined in the CPU_func.c file. These function names, which start with AL, can be used in defining parts and are described above in the function library. The body of the function referred to in the CPU.part file are supplied by the users in the CPU_func.c file. The format for the functions is defined as follows:

```
USER_FUNC [function name(<parameter name>, <parameter name>,:,:]
    INTEGER    <parameter name> <parameter name>;
{
    <c statements>
    :
    :
}
```

The function body uses C language syntax and should be enclosed in braces ({}). Header to the function body uses the key word USER_FUNC followed by the function name with its arguments in parenthesis. Arrays are declared using the "*" before the name are required by C language. A parts definition for an ALU defined with function icon 82m with add and subtract functions is shown as follows:

```
part MY_ALU   async
inport    A[8]
cnport    C[1]
inport    B[8]
outport   S[8]
    Function    AL_Add
                parm0 A
                parm1 B
                sel_func    C   1
                delay 10.0
    Function    AL_Sub
                parm0 A
                parm1 B
                sel_func    C   0
                delay 12.0
output    U[1]
    Function    Under_Flow
                parm0 A
                parm1 B
                delay 8.0
```

The following represents function bodies referred to in the above textual description:

```
TOOL_FUNC    AL_Add(a,b)
    INTEGER  a,b
{
    return (a+b);
}
TOOL_FUNC    AL_Sub(a,b)
    INTEGER  a,b;
{
    return (a-b);
}
USER_FUNC    Under_Flow (data1,data2)
    INTEGER  data1, data2;
{
    if ((data1-data2) < -256) return (0);
            else return (1);
}
```

Referring to FIG. 14, behavioral simulation model 138 contains a netlist of mapped behavioral attributes for a series of DDG nodes and arcs. The netlist is provided by user-defined input to the various node forms of selected icons. An exemplary netlist for the parallel shifter is set forth in the USERS MANUAL. The netlist 138 is read by a simulator engine 139 and, based upon a stimulus of input values 140, an output sequence is presented at the output node 142 of the physical device being modeled. Incorporated herein is a simulator program source code listing which performs the simulation, and is designated as reference numeral 141.

The behavioral netlist, which is stored as a data array, consists of connection among DDG nodes. Each node and arc in the DDG (behavioral) model is given a unique number and attributes of the node are stored as a list which contains node type, input arc and output arc numbers and mapped attributes. Behavioral netlist 138 is converted to an RTL netlist 130 when input vectors (values), selected by the user, stimulate the simulator engine 139. The stimulus of input vectors 140 comprise a sequence of input vectors supplied to the input nodes of the DDG modeled netlist. input nodes for the exemplary parallel shifter comprise node AB and data. The input nodes are stimulated after the completion of the previous input stimulation. Thus, the input nodes are stimulated with input vectors which are read in sequential order. The following represents a list of input vectors necessary to stimulate the simulation engine in order to produce output 142 at an output node of the exemplary parallel shifter:

| AB | Data |
|----|------|
| 0  | 1234 |
| 0  | 1234 |
| 1  | 1234 |
| 1  | 1234 |
| 2  | 1234 |
| 2  | 1234 |
| 3  | 1234 |
| 3  | 1234 |
| n  | n    |
| n  | n    |
| 1  | 1234 |
| 3  | 1234 |
| 0  | 1234 |
| 2  | 1234 |
| n  | n    |
| 2  | 1234 |
| 0  | 1234 |
| 3  | 1234 |
| 1  | 1234 |
| n  | n    |
| 3  | 1234 |
| 2  | 1234 |
| 1  | 1234 |
| 0  | 1234 |
| n  | n    |
| 0  | 1234 |

A user can insert null vector in the input sequence file by inserting a line with "n" for each data input. Each line thereafter contains the data value or "n".

Verification of the behavioral model derived by DDG techniques is performed by comparing simulator output 142 with an expected output 143 at an identical output node of the physical device. Based on a specific input sequence, simulator output 142 must equal an expected output in order to verify that the behavioral netlist is accurate. If the comparison indicates behavioral model accuracy, then behavioral model verification 145 is complete. Accordingly, behavioral model verification occurs at an early stage in the RTL model derivation process. If the behavioral model is not verified, then changes can be made early on in the simulation process. Behavioral simulation/description is obtained by applying input sequence 140 to an array of data values (taken from user-defined behavioral netlist 138) and monitoring output node 142. In the parallel shifter device, ShiftOut is the output node to be monitored at step 142. Given a known input sequence and a derived output value, behavioral model can be obtained from events and transitions upon array 138.

Behavioral model verification and RTL model generation steps 147 are shown in FIG. 14. Steps 147 therefore include not only behavioral model verification but also steps necessary to reduce behavioral model netlist 138 to RTL model netlist 130. RTL model 130 is generated by reading a "trace file" generated by simulator program 141 at each clock edge of the clock signal shown in FIG. 3. A watchdog timer 151 is used to monitor transitions of events at various states having values which transition at clock edges. Thus, select internal states are monitored at step 148 based upon whether events transition at those states at rising edges of the clock signal. If a transition occurs, then the transition is monitored and stored to indicate a state transition. A monitor program 153 appended and incorporated herein as a source code listing, performs the monitoring algorithm and the storage of state values and state transitions. Accordingly, monitoring program 153 computes an FSM of current states and current values (dvalid, etc.) at each clock transition for various internal states within the physical device. Based on the current state and current values, a new state and state transition can be derived to complete the FSM analysis at various states within the physical device. The FSM completes the control path specification and, given the netlist of data path elements, a more complete (synergistic) RTL model 130 is produced. RTL model 130 contains both data path and control path parameters, wherein the control path is defined by clocking frequency of watchdog timer 151 and monitor program 153.

Used merely as an example, the following Table III illustrates event propagation from node-to-node of the behavioral netlist for the parallel shifter:

TABLE III

| Clock | 82e | 82f | 82d2 | 82g | StateDef. | AB | dvalid |
|-------|-----|-----|------|-----|-----------|----|--------|
| 0     |     |     |      |     | 0         | 10 | 1      |
| 1     | x   | x   |      |     | 1         | 10 | 0      |
| 2     |     |     | x    |     | 3         | 10 | 0      |
| 3     |     |     |      | x   | 2         | 10 | 0      |

Event propagation sampled at the clock edge is illustrated n the above Table III for control input AB values of 10 and valid value of 1 for the parallel shifter. State transitions can be derived from flow of events. The events low through node 82a while transitioning from state 1 to he next state. The next state is dependent upon the value control variable AB. The following Table IV represents state transitions to the exemplary parallel shifter:

TABLE IV

| From State | To State | AB | dvalid | LS Used |
|------------|----------|----|----|---------|
| 0          | 1        | d  | 1  |         |
| 1          | 3        | 10 | 0  | x       |
| 3          | 2        | d  | 0  | x       |
| 2          | 0        | d  | 0  |         |

A don't care condition value is represented as a "d" condition. Dvalid value of 1 indicates arrival of new input. State transitions defined in FSM and control path variables are obtained from monitor program 153 and coded in HDL (VHDL or Verilog). Table IV, second line state Transition coded in Verilog is as follows:

@ posedge clk
if(state==1)&&(AB==01)&&(dvalid==0)
 then state=3;

The multiplexer selects the port connected to LS component (hardware instance) during state 1 with value of AB to be 10 and state 3. Output is available in state 2. These values are monitored during simulation and the following expressions are generated for the decoder logic to form various decode, select and encode logic necessary to operate the data path from the control path state machine. Using the above HDL example for the parallel shifter second and third state transition, the following decoder logic for MUX input which selects LS is provided:

((state==1)&&(AB==10)&&(dvalid==0))||
((state==3)&&(dvalid==0))

The above expressions are constructed in HDL for not only decode logic, but any control logic necessary to control timing of the RTL data path from a derived control path. All types of inputs and their sequences are supplied to the architectural model and only the new expressions are appended to the decode, select, enable and output logic.

RTL model 130 is based upon a complete set of stimulus vectors or input sequence 140. Simulation-based methodology requires the user to supply a sufficient number of input vectors to verify that the behavioral design and the design is only accurate within the design space of the input vectors. Input vectors, and their selection, not only verifies the behavioral model, but also generates the RTL model. Simulator program uses the underlying simulator engine and maintains the values needed by the monitor program. These values include the event location in the DDG nodes and arcs and the values of control variables. The monitor program executes on every positive clock edge and reads the values generated by the simulator program. The monitor program builds an extensible data array which is updated every time the program executes on clock edges. The array or arrays keep the control expressions for select, decode, enable and output logic as well as state and state transition values to complete the control path modeling and storage thereof. The control expressions are appended to the existing expressions if new conditions are detected. Similarly, new states are created if the current state is non-existence. The arrays are later used to construct RTL model in Verilog or VHDL language.

As appreciated from FIG. 14, simulation is used to verify designs using the simulation engine. A designer can develop a behavioral model representing a design, and can verify its correctness by simulation. Verification consists of stimulating design by a sequence of input vectors in comparing the simulation outputs against the expected results. The claims of correctness and completeness of the design is limited to the set of input vectors.

Digital simulators are event based and generally process events in defined time intervals. Digital simulators, similar to simulator engine 139, maintains a simulation clock. The simulation clock is used to define a time base resolution necessary to set forth a timed sequence of events.

It is further appreciated from FIG. 14, that a control path can only be in one state at any time, and a new state is only a function of the previous state and the current inputs. The new state is derived from the previous state and current inputs (or values) to formulate a state transition. The number of states required to represent control of any synchronous hardware design modeled by the present methodology is known to be finite. The RTL model represents register transfers from one register to another. Data is read from a set of registers, computations are performed on these data values, and new values are written to a subsequent set of registers based upon finite state information. Many of these sequence of operations can take place concurrently, and all of these operations are performed between two successive clock cycles. Control circuits provide the control signals to initiate the sequence of operations, and some computations take more than a single clock cycle. The control circuit or control path then takes multiple states to complete such computations.

Figure 15:
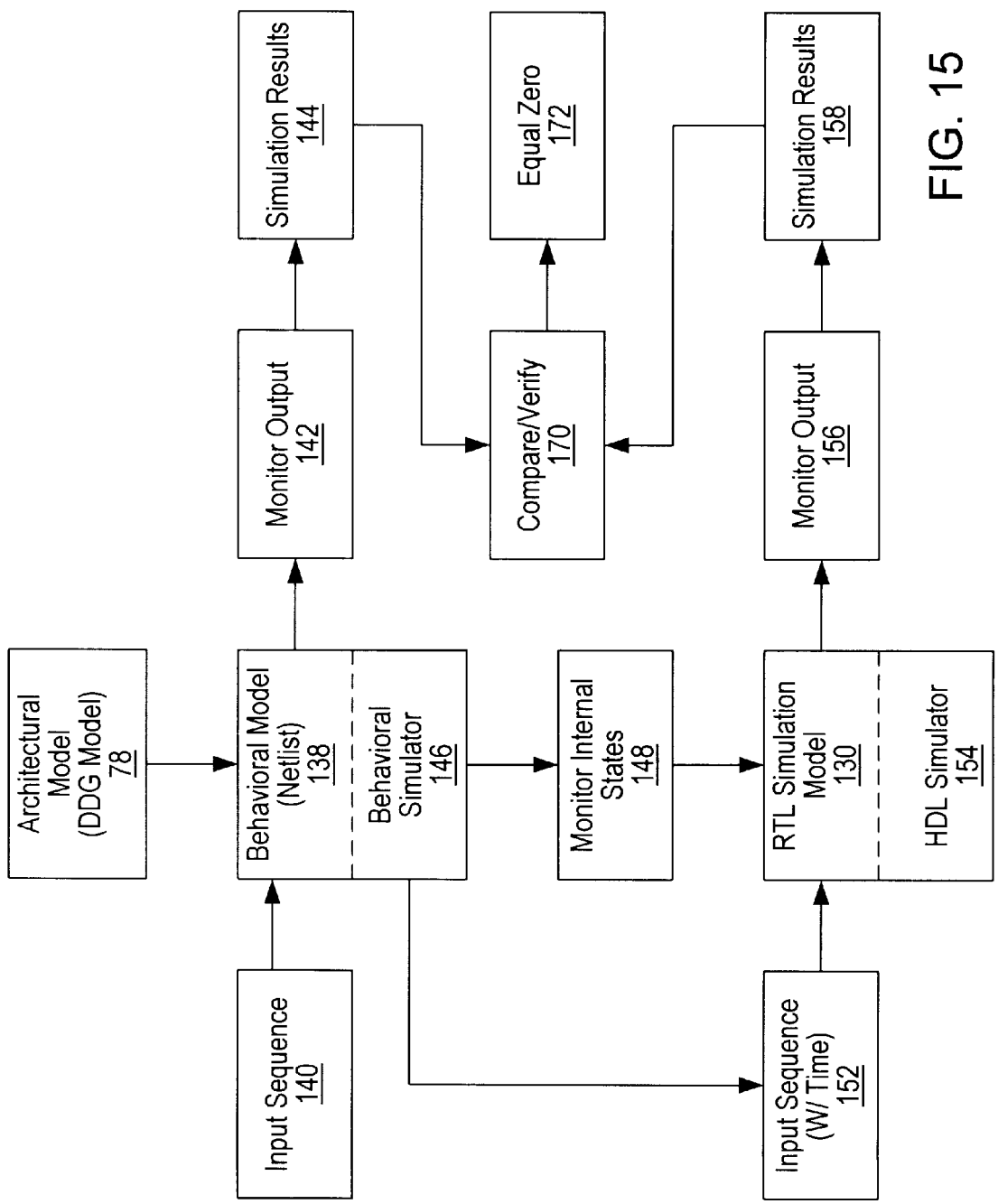
FIG. 15 is a flow diagram of translation steps for converting a DDG model to an RTL model according to the present invention.

FIG. 15 illustrates two additional features of the present methodology. First, the RTL derived model can be compared or verified with the behavioral model. The behavioral model has previously been verified by comparing simulator output with expected output. Thus, RTL model can be verified back to expected behavioral output values to ensure an accurate RTL description of the expected behavioral description. Not only is RTL verification important, but input sequences and timed arrival of those sequences to the RTL model is also important. Thus, a consistent time-stamped set of input sequences is derived from the behavioral simulator 146.

With respect to RTL verification, the RTL model netlist 130 is simulated by a conventional HDL simulator 154. Simulator 154 produces monitor output 156 at an output of the physical device being modeled. The monitor output node at step 156 indicates a simulation result 158 which, if the RTL model is accurate, is identical to the simulation result 144 derived from behavioral model output monitoring step 142. Comparison step 170 at the same output node must produce the same result. Simulation results 144 and 158 for a specific input sequence 152 will therefore be identical if the control path modeling is successful as is shown by step 172.

HDL simulator 154 is well known in the industry as any simulator which operates upon VHDL language of an RTL model. HDL simulators read multi-level HDL language (behavioral, structural and gate level). The RTL model, and VHDL language thereof, is derived from internal states 148, as described above. One skilled in the art would know and understand various simulation tools and techniques, as well as HDL simulators, used to produce steps 156 and 158.

RTL simulation model is stimulated at various simulation times kept in queue. Simulation proceeds with the lowest time values first and advances the simulation time to the next event queue. Thus, a range of input sequences for a defined time period allows stimulation of the model at select input values to determine output values for those select input values within the given time range. Input sequence with time range therein defined, is referenced by step 152. Behavioral simulator 146 defines numerous events and the time in which the time in which the events occur for a time beginning at zero seconds to some time thereafter. Specific blocks of time (time-stamped blocks) are derived from behavioral simulator 146, a listing of behavioral simulator output is appended and incorporated herein.

Once RTL model 130 is formed according to the algorithm and code listings herein incorporated in the appendix, a complete model at the RTL structural level is obtained based on values and events. The RTL model can be mapped to a technology dependent design shown in FIG. 4. Referring to FIG. 4, logic mapping step 160 is determined from selection and connection of logic gates from a logic gate library 162. Conversion from RTL description in an VHDL or Verilog format to logic gates is well known and documented in the VHDL art using standardized compiler and simulators from a VHDL netlist contained within RTL description 130. U.S. Pat. No. 5,222,030 describes a way in which VHDL netlist within an RTL description can be mapped to logic gates for technology dependent physical implementation. Moreover, Patent '030 also describes mapping of logic gates to structures used to form the gates within an integrated circuit layout design 164. Layout is performed from standard layout cells 166 available to the integrated circuit designer. Accordingly, integrated circuit layout is not only technology dependent, but is also dependent upon the substrate starting material and the photolithography process chosen.

The verification aspect of simulation results comparison is shown as process step 170 in FIG. 14. Simulation at input sequence 152 of FIG. 14 begins at 0 time and ends when no events are pending or when a user specified simulation time has arrived. Events are created as the result of applying input vectors to the input of the digital device. These vectors propagate within the device and produce output after a specified time has elapsed. The simulators used can examine the values of the selected signals within a digital device by monitoring associated events. Design verification process thereby consists of stimulating the device by a set of input vectors and comparing the simulation output against expected output and/or against earlier derived output (i.e., behavioral output). The behavioral simulator 146 is used not only for design verification at a behavioral level, but also for RTL model generation. The appended source code program operates by sampling the activation of data path elements (values), location of simulation events in the DDG model 78, and the values of control variables (e.g., exemplary control variables for the parallel shifter comprise variables A and B) at every rising edge of the clock. A unique set of locations of these events is defined to be a distinct state. Each subsequent clock edge may have new values for these locations and conditioned variables from the previous clock edge. These changes define the state transitions, which consists of change from one state to another under the control variables values sampled in the previous clock edge. These states and transitions are stored in internal data array and are used at the end of simulation to derive the information needed for the control path of the RTL model. The decode, enable, select, etc. expressions for the shared instance are constructed using these sampled values including the activation information of the data path instance.

DDG model 78 is mapped to the data value array 138. Behavioral simulator 146 interprets the node types and processes the assigned function defined within the various node forms. Simulator 146 then creates the output events denoted by the arcs within the DDG. These events traverse to the nodes in a directed, "atomic" fashion. This process continues until the sink or output node receives all of the event transitions.

The internal states and values within the array are monitored at each rising edge clock. The values are converted at step 147 to logic expressions for each state needed to describe an RTL control path. Thus, the conversion algorithm populates values in a defined but extensible control path structure. These values are represented as logic expressions in both data and control path descriptors.

Graphically producing a DDG model using behavioral descriptions is therefore an important advantage of the present invention. The DDG model is captured in an object-oriented, graphical user interface having nodes and arcs. Each node is mapped to user-defined attributes according to pull-down menus associated with that node. The user can readily complete the attributes within a node form, pull-down menu to specify timing, function, and structural characteristics. Once the nodes and arcs are connected, and the user-defined attributes are assigned in a mapping methodology, a composite architectural model (DDG model) is generated having data path characteristics. Any change to the node and arc layout, or the attributes of one or more nodes correspondingly changes the DDG model and the data matrix defined by that model. Monitoring the internal states for an input sequence at clock transitions allows the user to automatically generate a complete data and control path RTL model. Simulation results from the RTL output can be compared with the behavioral simulation model to ensure proper modeling has been achieved. The process flow necessary to formulate and define the RTL model from icons (or nodes) placed and defined in a graphical user interface is described above in reference to FIGS. 4, 14 and 15. It is understood that the RTL model is in VHDL or Verilog format and any subsequent conversion of RTL to physical design and/or integrated circuit design is well known and established in the art.

It will be appreciated to those skilled in the art having the benefit of this disclosure that this invention is believed to be capable of applications with any type of digital device or devices, and can be used in a behavioral model defined with graphical user interface having object-oriented nodes and arcs to define functionality and conversion to structural level RTL description. RTL conversion to lower level technology dependent structures and applications are understood as a form of the invention shown and described. Conversion from the behavioral description to structural RTL description is taken as a presently preferred embodiment. Various modifications and changes may be made to each and every compilation, simulation and synthesis step without departing from the spirit and scope of the invention as set forth in the claims. It is intended that the following claims be interpreted to embrace all such modifications and changes and, accordingly, specification and drawings are to be regarded in an illustrative rather than a restrictive sense.

What is claimed is:

1. A method for graphically designing a digital device, comprising the steps of:

identifying a fixed and limited number of descriptors which behaviorally describe any digital device to be designed;

placing symbolic icons representing at least two of said descriptors upon a graphic display and operationally connecting said icons with an arc placed therebetween; and using a pull-down menu activated from said placed icons, thereafter defining a list of attributes to said icons, wherein said attributes include both data path and control path information for a digital device graphically designed from said placed icons.

2. The method as recited in claim 1, wherein each said symbolic icon is configured as a node upon said graphic display, said icon is selectable after placement on said display and, after selection, said icon includes a menu-driven node form adapted for receiving user input of said attributes.

3. The method as recited in claim 1, wherein said data path information comprises hardware component type, input/output ports for said component type, and functionality for said component type.

4. The method as recited in claim 1, wherein said data path information comprises a software module, input/output parameters of the software module, and functionality of the module.

5. The method as recited in claim 1, wherein said control path information comprises timing of signals sent to said data path and operation priority of hardware component arranged within said data path.

6. The method as recited in claim 1, wherein said control path information comprises an enable signal sent to said data path and operation priority of a software module arranged within said data path.

7. The method as recited in claim 1, further comprising:

applying a sequence of simulation vectors to the graphically modeled said digital device and monitoring the output of a first icon to produce a sequence of output values; and verifying the accuracy of said graphically modeled said digital device by reading said sequence of output values and comparing said sequence of output values against a user-defined sequence of expected values.

8. The method as recited in claim 7, wherein said applying step comprises stimulating a netlist of data values representing said graphically modeled said digital device.

9. The method as recited in claim 7, wherein said applying step further comprises monitoring the output of a select set of icons at rising edges of a clocking signal to determine events at said set of icons and transitions of said events between said rising edges of the clocking signal.

10. The method as recited in claim 9, wherein said events and transitions of said events comprise a finite state machine representative of control path information for said digital device.

11. A method for capturing a digital device as a behavioral description and for converting the behavioral description to a structural description, said method comprising the steps of:

constructing a behavioral description of a digital device upon a graphic display by graphically connecting a set of symbolic icons drawn from a fixed number of icons contained within an icon library having fewer than fifteen icons;

mapping user-defined inputs to each of said symbolic icons to define a graphical model having data path attributes of said digital device;

representing said graphical model as a matrix of data values corresponding to binary values at a plurality of internal states within said graphical model;

applying a set of input values to said matrix of data values to modify said matrix and, simultaneous with rising edges of a clocking signal, monitoring the modified said matrix at select said internal states;

determining events at the select said internal states, and determining transitions of said events at said internal states between said rising edges of the clocking cycle; and combining events and transitions of events to produce a finite state machine having control path information, and merging said control path information with said data path attributes to produce a structural description of said digital device.

12. The method as recited in claim 11, wherein said structural description is described in RTL form and in an HDL language.

13. The method as recited in claim 11, wherein said structural description is described as interconnection of software modules, wherein said software modules represent software operation and are represented in programming language.

14. The method as recited in claim 11, wherein said mapping step comprises selecting an icon configured on said display and activating a pull-down menu from the selected said icon, wherein said pull-down menu is adapted to receive said user-defined inputs.

15. The method as recited in claim 14, wherein said pull-down menu is designed to receive inputs from a parts library comprising functions from a function library, hardware instances, input and output ports for each said instance, and timing priority.

16. The method as recited in claim 11, wherein said set of symbolic icons comprise fewer than fifteen symbolic icons capable of representing each and every possible behavioral description of said digital device.

17. The method as recited in claim 11, wherein one of said set of symbolic icons represents a pipeline icon.

18. The method as recited in claim 11, wherein said applying step further comprises applying a subsequent sequence of input values after said sequence of input values have been fully applied.

19. The method as recited in claim 11, wherein said data path attributes comprise a data path of hardware components and transfer signals sent between said components, and wherein said control path information comprises a control path of finite states for each of said hardware components and control logic for timed operation of said components.

20. The method as recited in claim 19, wherein said hardware components comprise registers.

21. The method as recited in claim 19, wherein said control logic comprises tri-state and multiplex (MUX) components.

22. The method as recited in claim 11, wherein each data value within said matrix of data values is modified before said data value receives a subsequent input value within said set of input values.

23. The method as recited in claim 11, wherein modifications to said matrix of data values are presented upon said graphic display as said events at a time selected by a user.

24. The method as recited in claim 11, wherein modifications to said matrix of data values are presented upon said graphic display as a timed event.

25. A method for capturing a digital device as a behavioral description, for converting the behavioral description to a structural description, and for verifying the behavioral and structural descriptions of said digital device, said method comprising the steps of:

providing a library of less than fifteen descriptors which behaviorally describe any digital device to be modeled;

placing symbolic icons representing at least two of said descriptors upon a graphic display and operationally connecting said icons with an arc to produce a behavioral description of a digital device;

using a pull-down menu activated from selection of said placed icons, mapping entries made by a user to said pull-down menu to define a graphical model having data path attributes of said digital device;

representing said graphic model as a matrix of data values corresponding to binary values at a plurality of internal states and an output state of said graphical model;

applying a set of input values to said matrix of data values to modify said matrix and produce a sequence of output values;

monitoring said a sequence of output values at the output state of said graphical model and, simultaneous with rising edges of a clocking signal, monitoring a resulting sequence of output values at select said internal states of said graphical model;

determining events at the select said internal states, and determining transistions of said events at said internal states between said rising edges of the clocking cycle;

combining events and transitions of events to produce a finite state machine having control path information, and merging said control path information with said data path attributes to produce a structural description of said digital device;

representing said structural description as a matrix of register-transfer level (RTL) data values corresponding to binary values at said output state; and verifying the accuracy of said structural description by comparing the output values at the output state resulting from said applying step with the output values at the output state resulting from said representing step.

* * * * *